Patented June 6, 1939

2,161,290

UNITED STATES PATENT OFFICE 2,161,290

COATING COMPOSITION

Hans Georg Grimm, Heidelberg, and Friedrich Schamberger, Ludwigshafen - on - the - Rhine, Germany, assignors to I. G. Farbenindustrie Aktiengesellschaft, Frankfort - on - the - Main, Germany No Drawing. Application July 28, 1937, Serial No. 156,094. In Germany August 4, 1936

1 Claim. (Cl. 134—1)

This invention relates to improvements in the production of coating compositions which comprise an aqueous solution of a phosphoric acid and a pigment-like oxidic compound, in particular an oxidic compound of an element selected from the group consisting of the first columns of the fourth, sixth and seventh group and of the iron group of the periodic system. Such coating compositions are described in the United States application Ser. No. 76,769, filed April 28th, 1936. The said coating compositions are applied at ordinary temperature in the same way as oil paints, they set or harden in the air or by moderate heating and yield adherent coatings on substrata, such as metals or porcelain.

We have now found that the coating compositions of the said kind can be improved by incorporating therewith aluminum hydroxide which may also contain aluminum oxide. When using reversible colloidal aluminum hydroxide, such as is obtainable according to the United States Patent No. 2,085,129 and United States application Ser. No. 9,589, filed March 6th, 1935, excellent coating compositions are obtained which yield lustrous coatings. When employing many other products, as for example 50 percent commercial aluminum hydroxide paste, matte films are formed. The amount of aluminum hydroxide may be varied within wide limits. A film may even be produced with aluminum hydroxide and phosphoric acid alone, but it has no great covering power.

The said coating compositions are especially suitable for absorbent substrata, such as wood, paper, cardboard, textiles, natural stones, brickwork and the like. They do not sink into such substrata or only sink in to a slight extent and yield very good films. The compositions may also be well employed as priming or knifing compositions. They may be covered with other coating agents, such as oil paints. Although they are mainly intended for use with absorbent substrata, they may also be used on non-absorbent substrata because they are superior in their capacity for being painted and dried and also in the density of their films to the coating compositions according to the said U. S. application 76,769.

The following examples will further illustrate the nature of this invention but the invention is not restricted to these examples. The parts are by weight.

Example 1

100 parts of copper silicate, 100 parts of titanium dioxide, 50 parts of reversible aluminum hydroxide having a content corresponding to 50 per cent of $Al_2O_3$ and prepared according to the said U. S. Patent No. 2,085,129, and 320 parts of aqueous phosphoric acid having a specific gravity of 1.215 at 20° C. are mixed together. By painting on wood, an almost white, lustrous film is formed.

Example 2

100 parts of zinc phosphate, 200 parts of titanium dioxide, 50 parts of the reversible aluminum hydroxide referred to in Example 1 and 300 parts of aqueous phosphoric acid having a specific gravity of 1.215 at 20° C. are mixed together. The composition is suitable for coating wood, cardboard, paper and cotton fabrics. The coating may be effected on a dry or moist substratum. The hardening is greatly accelerated by drying in a slightly ammoniacal atmosphere. In any case hard covering layers are formed.

Example 3

60 parts of talc, 40 parts of kaolin, 20 parts of iron oxide, 20 parts of reversible aluminum hydroxide containing 50 per cent of $Al_2O_3$ obtained according to the said application Ser. No. 9,589 and 140 parts of phosphoric acid having a specific gravity of 1.254 at 20° C. are mixed together. The composition is applied to wood, concrete or iron in the form of putty. The putty may also be polished.

Example 4

250 parts of titanium dioxide, 100 parts of powdered natural pyrolusite, 90 parts of the reversible aluminum hydroxide referred to in Example 3 and 210 parts of phosphoric acid having a specific gravity of 1.3 at 20° C. are mixed together. The composition may be employed for coating non-absorbent, as for example iron, substrata, in the same way as those obtainable according to the foregoing examples.

Example 5

100 parts of talc, 40 parts of kaolin, 20 parts of iron oxide, 20 parts of the reversible aluminum hydroxide referred to in Example 3 and 500 parts of phosphoric acid having a specific gravity of 1.215 at 20° C. are stirred into a homogeneous mass. This may be used as a priming or covering coating on the priming coatings obtainable according to Examples 1 to 4 and yields lustrous films.

What we claim is:—

Coating compositions of the consistency of oil paints, comprising an aqueous solution of a phosphoric acid having a specific gravity of 1.2 to 1.3 and a pigment-like oxidic compound of an element selected from the group consisting of the first columns in the fourth, sixth and seventh group and the iron group of the periodic system, which sets and hardens with the phosphoric acid, and a reversible colloidal aluminum hydroxide.

HANS GEORG GRIMM.
FRIEDRICH SCHAMBERGER.